(12) United States Patent
Schöni

(10) Patent No.: US 8,841,925 B2
(45) Date of Patent: Sep. 23, 2014

(54) METHOD FOR TESTING A LABORATORY DEVICE AND CORRESPONDINGLY EQUIPPED LABORATORY DEVICE

(75) Inventor: Markus Schöni, Nänikon (CH)

(73) Assignee: Tecan Trading AG, Mannedorf (CH)

( * ) Notice: Subject to any disclaimer, the term of this patent is extended or adjusted under 35 U.S.C. 154(b) by 523 days.

(21) Appl. No.: 12/917,015

(22) Filed: Nov. 1, 2010

(65) Prior Publication Data

US 2011/0102004 A1     May 5, 2011

(30) Foreign Application Priority Data

Nov. 2, 2009    (CH) ........................................ 1679/09

(51) Int. Cl.
*G01R 27/26*     (2006.01)
*G01F 23/26*     (2006.01)
*B01L 3/02*     (2006.01)

(52) U.S. Cl.
CPC ....... *G01F 23/266* (2013.01); *B01L 2300/0627* (2013.01); *B01L 3/021* (2013.01)
USPC ........... 324/664; 324/665; 324/667; 324/453; 73/304 C

(58) Field of Classification Search
USPC ...... 324/61 R, 60 C, 548, 663, 669, 678, 686, 324/750.01, 665, 664; 73/304 C, 864.24
See application file for complete search history.

(56) References Cited

U.S. PATENT DOCUMENTS

| | | | |
|---|---|---|---|
| 3,901,079 A * | 8/1975 | Vogel | 73/304 C |
| 4,224,606 A | 9/1980 | Bartles | |
| 4,235,106 A * | 11/1980 | Maltby et al. | 73/304 C |
| 4,459,541 A * | 7/1984 | Fielden et al. | 324/678 |
| 4,912,976 A * | 4/1990 | Labriola, II | 73/290 R |
| 4,977,786 A * | 12/1990 | Davis | 73/864.24 |
| 5,027,075 A * | 6/1991 | Harding, Jr. | 324/662 |
| 5,121,632 A | 6/1992 | Keeler et al. | |
| 5,365,783 A * | 11/1994 | Zweifel | 73/304 C |
| 5,866,426 A * | 2/1999 | Ball | 436/54 |

(Continued)

FOREIGN PATENT DOCUMENTS

| | | |
|---|---|---|
| CN | 101004424 | 7/2007 |
| DE | 101 53 298 | 5/2003 |

(Continued)

*Primary Examiner* — Richard Isla Rodas
(74) *Attorney, Agent, or Firm* — Notaro, Michalos & Zaccaria P.C.

(57) ABSTRACT

The invention relates to devices for liquid level detection (LLD). It relates to a laboratory device having an electronic circuit for detecting a liquid level in a liquid container, a feeler, which can be advanced, and which is connected to an input side of the electronic circuit, and having a movement device, which allows the feeler to be advanced in the direction of the liquid in the liquid container. Upon the immersion of the feeler in the liquid, a capacitance change is caused in the electronic circuit, which triggers a signal in the circuit. The laboratory device comprises a reference circuit, which is connected to the input side of the circuit, and which specifies an effective capacitance on the input side of the circuit. A sequence controller is used, which causes the triggering of a test by the application of a control signal to the reference circuit, the control signal causing an increase of the effective capacitance through a switching procedure. The processing of the corresponding capacitance change is monitored by the sequence controller, for example.

11 Claims, 7 Drawing Sheets

(56) References Cited

U.S. PATENT DOCUMENTS

| | | | |
|---|---|---|---|
| 6,148,666 A * | 11/2000 | Roesicke | 73/290 R |
| 6,736,006 B2 * | 5/2004 | Arias | 73/290 R |
| 7,387,023 B2 * | 6/2008 | Harazin et al. | 73/290 R |
| 7,823,447 B2 * | 11/2010 | Harazin et al. | 73/304 R |
| 8,161,814 B2 * | 4/2012 | Calcote | 73/304 C |
| 2008/0053216 A1 | 3/2008 | Li et al. | |
| 2009/0120159 A1 * | 5/2009 | Barlesi et al. | 73/1.73 |

FOREIGN PATENT DOCUMENTS

| | | |
|---|---|---|
| EP | 0 658 748 | 6/1995 |
| GB | 2081452 A | 2/1982 |
| WO | WO 98/27520 | 6/1998 |

* cited by examiner

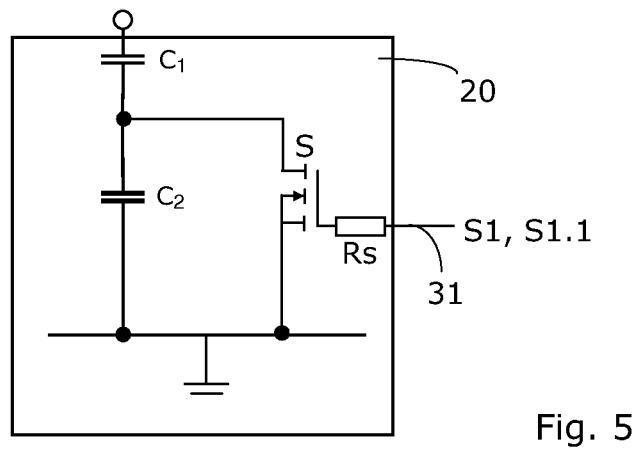
Fig. 5
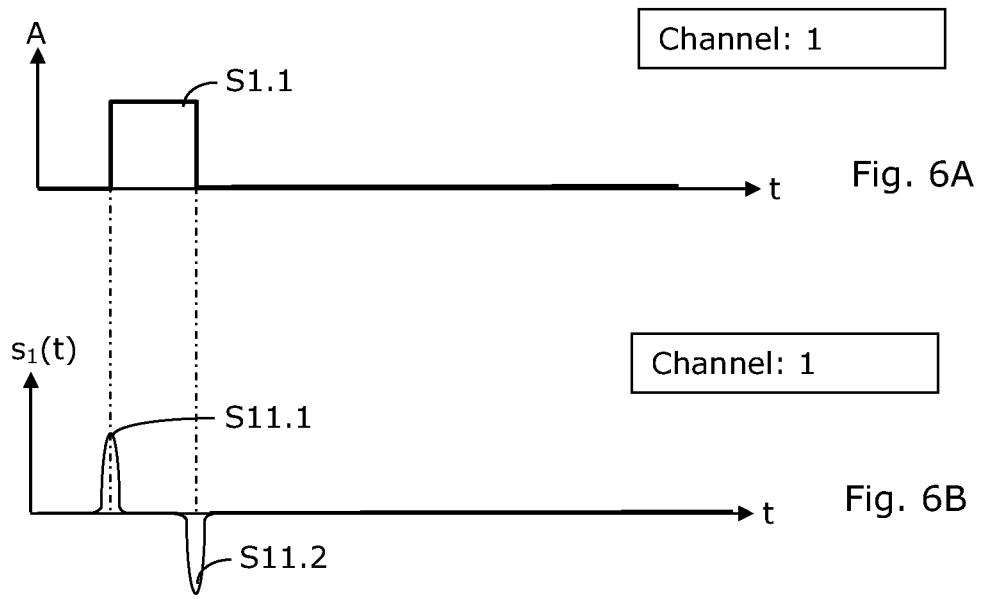
Fig. 6A
Fig. 6B

METHOD FOR TESTING A LABORATORY DEVICE AND CORRESPONDINGLY EQUIPPED LABORATORY DEVICE

The invention relates to methods for testing a laboratory device and a correspondingly equipped laboratory device. In particular, it is directed to laboratory devices and the testing of laboratory devices which are designed to detect a liquid level in a liquid container.

BACKGROUND OF THE INVENTION

There are numerous laboratory systems and medical and pharmaceutical devices, in which it is important to ascertain the fill level in test tubes, titration plates, or the like. In particular when the automation of measuring or experimental sequences is important, such a fill level ascertainment is significant. The fill level ascertainment is typically performed using detection of the liquid level, i.e., the interface between air and liquid is ascertained. This procedure is also referred to as liquid level detection (LLD).

In recent years, the laboratory devices have become more and more precise and complex. The trend is in the direction of higher integration and automation. This results in a high spatial compaction of the individual components. This compaction not only causes mechanical and other structural problems, but rather also the precision of the electronic analysis ability, the mutual influencing of adjacent measuring channels, and other aspects could result in problems.

The detection of the liquid level is typically performed in a capacitive way, as schematically shown on the basis of FIG. 1. FIG. 1 shows the construction of a known laboratory device 100, which is designed for detecting a liquid level. The presence of a liquid 1 or the interface between air and liquid 1 is detected, for example, by the observation of a capacitance change $C_{tip/liq}$, in that an electronic circuit 2 measures the effective capacitance between a feeler, for example, in the form of a pipette tip 3, and a grounded baseplate 4. The previously known laboratory device 100 can further comprise a circuit for signal processing, which is indicated here by a circuit element 8.

The mode of operation of the circuit 2 can differ depending on the capacitance measuring method. For example, an excitation using a sine wave signal can be performed by the circuit 2, in order to measure the phase shift using the circuit 2, which reflects the dize of the capacitance. It is also possible to charge a capacitance via a resistor and then perform a direct discharge of the capacitance via a transistor, such as an FET transistor.

A further capacitance measuring method would be the formation of an oscillating circuit, which comprises a coil and the measuring capacitance, and in which the resonant frequency is analyzed, which decreases with increase of the capacitance. The effective capacitance, which results depending on the laboratory device from the stray capacitances, electrical couplings by the feeler or the pipette tip 3, the conductivity of the liquid 1, and the crosstalk between adjacent measuring channels (referred to as next tip in FIG. 1) is very small and is typically in the range of a few picofarads (pF). In contrast, the capacitance change $C_{tip/liq}$, which results upon immersion in the liquid, is less by approximately a factor of 100 to 1000.

Typically, dedicated circuits 2 are used for the detection of the liquid level, which must be adapted very finely in order to permit a precise statement about the reaching of a liquid level on the basis of the very small capacitance change $C_{tip/liq}$. The corresponding circuits 2 are typically tested after the production and calibrated if necessary. The test expenditure is large during later use of a laboratory device 100 and requires the use of special test devices.

It is also problematic that the capacitance change $C_{tip/liq}$ to be measured is only to be recognized with difficulty in the measured output signal, since here, for example, stray capacitances, such as $C_{tip/tip}$, which originate through crosstalk of adjacent channels, and capacitance changes because of moving electrical supply lines, etc., are superimposed.

Therefore, the object presents itself of providing a method for detecting a liquid level and a corresponding laboratory device, which allows simple and ready testing of the detection circuit(s) and/or other elements of the laboratory device at any time.

The method or the laboratory device is preferably to be designed so that a self-test is possible, which preferably does not require manual or mechanical intervention.

These objects are achieved according to the invention by a method which simulates a detection of a liquid level. A corresponding reference circuit, which is a part of the laboratory device, is used for this simulation.

The method and device according to the invention are distinguished by the characterizing features of the claims.

In a particularly preferred embodiment of the invention, the simulation is performed each time the laboratory device is booted up or turned on and/or before each use of the laboratory device.

In a particularly preferred embodiment of the invention, the reference circuit is designed so that it is also capable of recognizing crosstalk between multiple channels and/or recognizing incorrectly connected or defective cable connections.

The laboratory device according to the invention or the method according to the invention will now be explained in detail on the basis of schematic drawings, which do not restrict the scope of the invention, of exemplary embodiments. In the figures:

FIG. 5 shows a schematic block diagram of a second reference circuit according to the invention;

FIG. 6A shows a schematic view of a further exemplary control signal according to the invention;

FIG. 6B shows a schematic view of an analog output signal of a first channel;

Advantageous embodiments of the invention are described hereafter, these being exemplary embodiments. These comprise both various implementations of the overall invention, and also assemblies and individual parts of the invention. Fundamentally, the described assemblies and individual parts of the various embodiments may be combined with one another, or the assemblies and individual parts of individual embodiments may be replaced by the assemblies and individual parts of other embodiments. The combinations formed in this case may require small adaptations which are typical to a person skilled in the art and are therefore not described in greater detail, for example, to allow cooperation or interlocking of the assemblies and individual parts.

In connection with the present invention, reference is made at various times to laboratory devices 100. These are devices, systems, facilities, handling centers, and the like, which are equipped with means for fill level ascertainment.

In connection with the present invention, a series circuit of capacitors is referred to at various times. It is known that only alternating currents or charging or discharging currents may flow through capacitors. A series circuit causes a capacitance reduction, comparable to an increase of the plate spacing at equal plate area. For example, if a capacitor of the series circuit is short-circuited, the overall capacitance of the series circuit increases. Therefore, upon contact or immersion of the feeler 3 into a liquid 1 (see FIG. 1), an increase of the effective capacitance occurs similarly, since the capacitor $C_{tip/liq}$ becomes greater or—in the event of high conductivity of the liquid 1—is even short-circuited at the moment of immersion in the equivalent circuit diagram (FIG. 2). The total capacitance rises by a very small value $C_{tip/liq}$ upon contact or immersion of the feeler 3 into the liquid 1.

As long as the stray capacitances remain unchanged, the following equation applies for the capacitance change $C_{tip/liq}$:

$$C_{meas} = \frac{C_{coupl} \cdot C_{tip/liq-in}}{C_{coupl} + C_{tip/liq-in}} - \frac{C_{coupl} \cdot C_{tip/liq-out}}{C_{coupl} + C_{tip/liq-out}}$$

$C_{tip/liq-in}$ standing for the capacitance $C_{tip/liq}$ when the feeler 3 is immersed in the liquid and $C_{tip/liq-out}$ standing for the capacitance $C_{tip/liq}$ when the feeler 3 is not immersed. $C_{coupl}$ stands for the coupling capacitor. This is the capacitance between a liquid 1 having good to poor conductivity and the baseplate 4. $C_{meas}$ represents the actual capacitance change, which is to be measured upon immersion of the feeler 3 into the liquid 1.

Or, if expressed as capacitance change $\Delta C_{tip/liq} = C_{tip/liq-in} - C_{tip/liq-out}$:

$$C_{meas} = \frac{C_{coupl}^2 \cdot \Delta C_{tip/liq}}{(C_{coupl} + C_{tip/liq} + \Delta C_{tip/liq}) \cdot (C_{coupl} + C_{tip/liq})}$$

Figure 1:
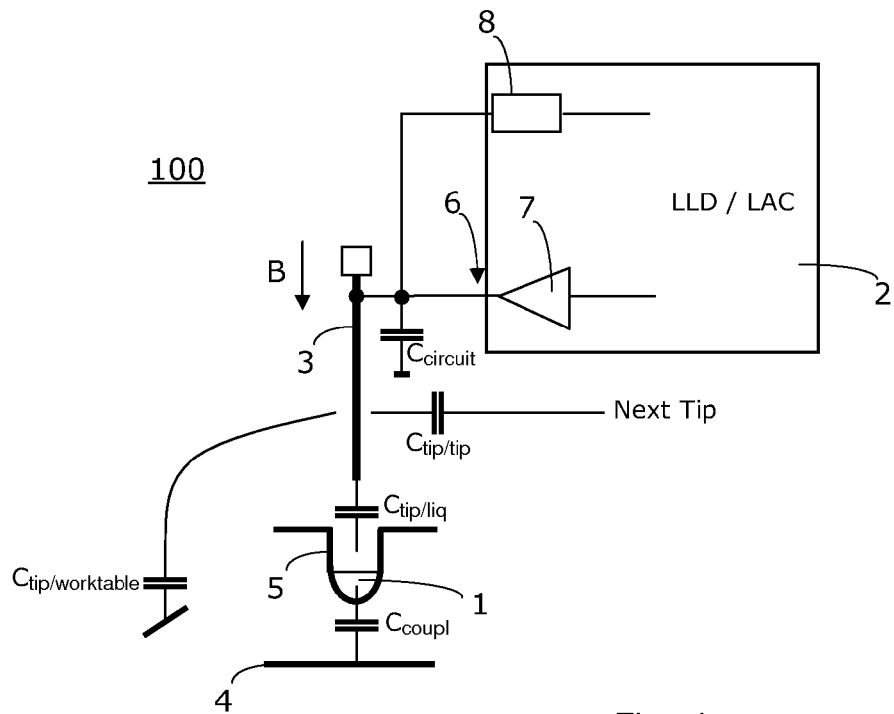
FIG. 1 shows a schematic side view of a laboratory device according to the prior art, to which a circuit according to the invention can be connected.
Figure 2:
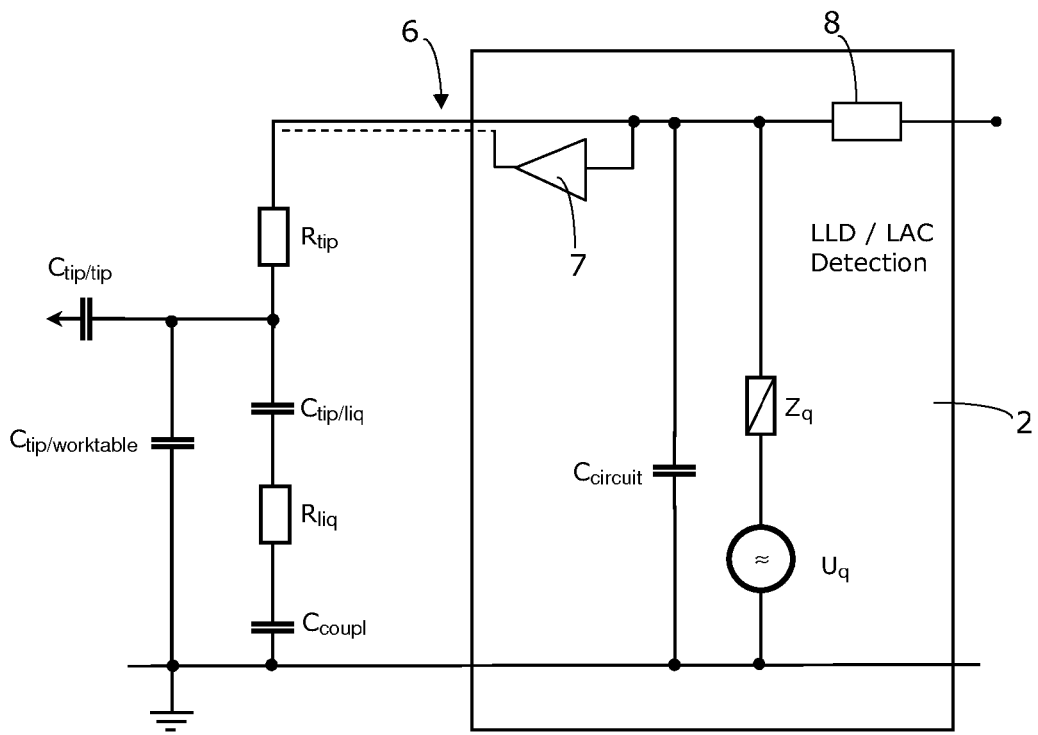
FIG. 2 shows a replacement circuit of the laboratory device according to FIG. 1.

The components or equivalent circuit elements in FIGS. 1 and 2 have the following meaning. $C_{tip/liq}$ describes the capacitance between the feeler 3 and the liquid 1. $C_{coupl}$ is the stray capacitance between the liquid 1 in the liquid container 5 and the baseplate 4. $C_{meas}$ represents, as already noted, the actual capacitance change which is to be measured upon immersion of the feeler 3 in the liquid 1. $C_{tip/tip}$ describes the stray capacitance between adjacent feelers 3, if the laboratory device 100 has more than only one measuring channel (see the channels 10.1 and 10.2 in FIG. 7, for example).

The electronic circuit 2, which is designated here for exemplary purposes by an amplifier 7, a circuit element 8, and by the symbol LLD/LAC, can be a known circuit for liquid level detection (LLB) and/or for liquid arrival check (LAC). The advancing movement of the feeler 3 is designated by B here. The equivalent circuit in FIG. 2 shows, in addition to the above-described elements, the resistors $R_{liq}$ and $R_{tip}$. $R_{liq}$ is the equivalent resistance of the liquid 1 and $R_{tip}$ is the equivalent resistance of the feeler 3. $Z_{tot}$ (not shown in FIG. 2) represents the total impedance and $Z_q$ represents the impedance of the voltage source $U_q$.

Figure 11:
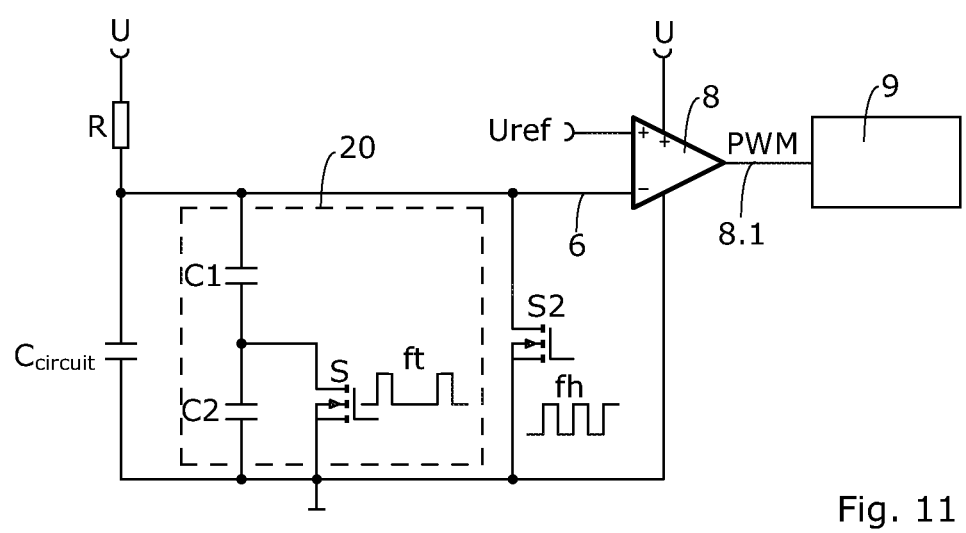
FIG. 11 shows an exemplary embodiment of an overall measuring circuit having reference circuit according to the invention.

FIG. 11 shows an exemplary embodiment of an entire measuring circuit having reference circuit 20. The function of this measuring circuit is described hereafter. In the present invention, the regular fill level measuring method of the measuring circuit is selected so that a reference capacitance, which is composed of two or more capacitances (e.g., C1 and C2 in FIG. 3 or FIG. 11) of the reference circuit 20, the capacitance $C_{circuit}$ ($C_{circuit}$ being composed of all further capacitances such as $C_{tip/liq}$, $C_{coupl}$, $C_{tip/worktable}$, $C_{tip/tip}$, $C_{filter}$, $C_{cable}$, etc.), and at least one switching element (e.g., S in FIG. 3), can be short-circuited for an established time and subsequently charged via a specific resistance value R. A comparator 8 switches through at a specific threshold. A PWM signal (PWM means pulse width modulation) is thus applied to its output 8.1, which is subsequently filtered and amplified by a signal analysis circuit 9. The clock frequency fh (e.g., between 100 and 1000 kHz, on:off=1:4), using which the mentioned capacitances are charged and short-circuited, can thus be filtered out, so that a lower frequency analog signal is provided at the output, which reflects the size of the capacitance. S2 is permanently activated (even if a test using the reference circuit 20 is active) using a high frequency (e.g., between 100 and 1000 kHz, on:off=1:4). S is only activated when a test is to be performed via the reference circuit 20, and is activated using a substantially lower frequency ft (e.g., between 1 and 40 Hz, on:off=1:3, or as a single pulse).

In FIG. 1, the amplifier symbol 7 represents the switching element (e.g., S in FIG. 3) and the charging resistor R and the switching element 8 represents the comparator, as well as the signal analysis circuit.

In contrast, amplifier 7 has a different function in FIG. 2: here it is a voltage follower or amplifier having amplification 1, which keeps shielding of a coaxial cable (which comes from feeler 3) at a low resistance at the same signal level as the measuring signal at the input 6 of the comparator 8. The technical term for this is active shield. The capacitance of the coaxial cable which connects the feeler 3 to the signal processing (approximately 120 cm length) is thus nearly 0 pF, i.e., more useful signal is obtained, since the relative capacitance change becomes greater upon immersion in the liquid 1.

The circuit element 8 has the same function in FIGS. 1 and 2, namely that of signal analysis, with the difference that in FIG. 2 the principle of the phase shift measurement is indicated, shown by the sine wave source $U_q$.

Figure 3:
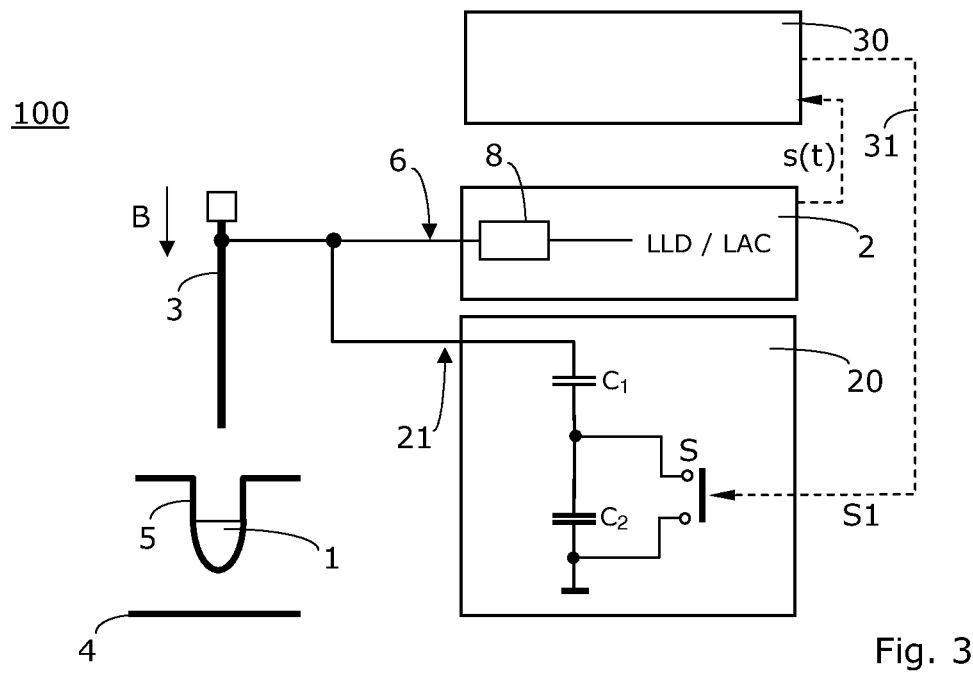
FIG. 3 shows a schematic block diagram of a first laboratory device according to the invention, which comprises a first reference circuit according to the invention.

A first laboratory device 100 according to the invention is shown in very schematic form in FIG. 3. The laboratory device 100 comprises a (conventional) electronic circuit 2 for detecting the liquid level in a liquid container 5. The entire measuring circuit is contained in the circuit 2, i.e., in the present case a circuit for discharging the capacitance and also the signal analysis comprising comparator 8, filter, and amplifier. In addition, the laboratory device 100 comprises a feeler 3 which can be advanced, and which is electrically connected via a coaxial cable to an input side 6 of the circuit 2. The movement device, which allows the feeler 3 to be advanced in the direction of the liquid 1 in the liquid container 5, is not shown, but the advancing movement is symbolized by the downward arrow B. Upon immersion of the feeler 3 in the liquid 1, a small capacitance change $C_{tip/liq}$ is induced on the input side 6 of the electronic circuit 2, which triggers an output signal s(t) in the circuit 2.

According to the invention, the laboratory device 100, or the measuring circuit of the laboratory device 100, comprises a so-called reference circuit 20, which is shown here as a simple circuit block. The reference circuit 20 has an output side 21, which is connected to the input side 6 of the electronic circuit 2. A switching element S is used, which can be actuated by a sequence controller 30 using a switching signal S1, for example. The actuation of the switching element S is indicated by a dashed arrow 31 in FIG. 3. The dashed arrow 31 represents a switching signal line for the switching signal S1.

The switch S causes the two capacitances C1 and C2 to be connected in series in the open state, and only the capacitance C1 to be active in the closed switch state. The difference of these two states results in the capacitance change C1−(C1·C2/(C1+C2)).

Figure 9A:
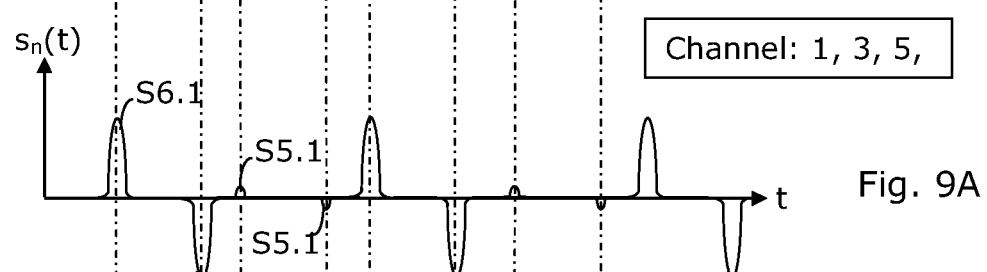
FIG. 9A shows a schematic view of an exemplary analog output signal of the odd-numbered channels.
Figure 9B:
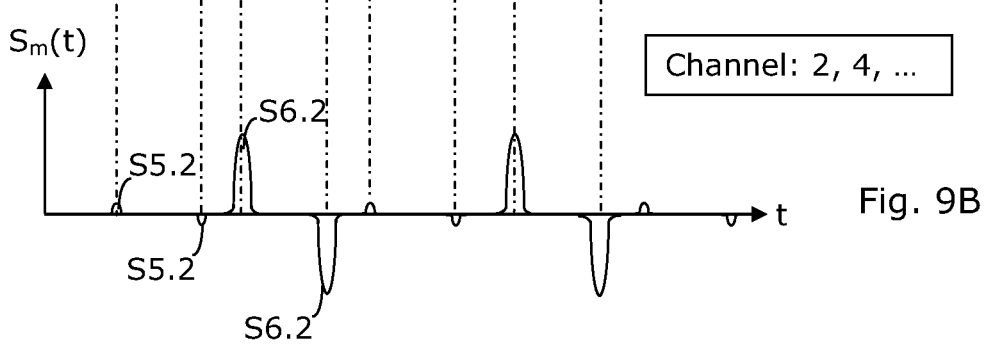
FIG. 9B shows a schematic view of an exemplary analog output signal of the even-numbered channels.

If one now wishes to test the crosstalk (influence W) between a feeler 3 and an adjacent feeler 3 (next tip), the switch S is closed and opened and the output signal s(t) (e.g., the signal $s_m(t)$ in FIG. 9B) of the adjacent channel is measured simultaneously.

After the connection of the output 21 of the reference circuit 20 to the input 6 of the circuit 2, a predefined (preferably permanently wired) effective capacitance is specified by the reference circuit 20 on the input side 6 of the circuit 2. The mentioned sequence controller 30 is designed so that it causes the triggering of a test by the application of a control signal S1 to the switch S of the reference circuit 20. The control signal S1 is transmitted via a control signal line 31 to the reference circuit 20, for example. The control signal S1 causes a small increase of the effective capacitance by a switching action, which is specified by reference circuit 20 at the input side 6 of the circuit 2, since the switch S is closed by the signal S1 and the capacitance C2 is short-circuited. The sequence controller 30 monitors the processing of the corresponding capacitance change by the circuit 2 and the triggering of an analog output signal s(t), which is induced in the circuit 2 by this small, predefined capacitance change. The sequence controller 30 can analyze the output signal s(t), for example, to allow a statement about the function of the circuit 2 in that, for example, the amplitude and/or the pulse width of the output signal s(t) is measured. It is indicated in FIG. 3 that the measured output signal s(t) is transmitted by the circuit 2 to the sequence controller 30, so that the sequence controller 30 can perform an evaluation of the output signal s(t), for example. The evaluation of the output signal s(t) can be performed, for example, by a comparison of the output signal s(t) to an analog target signal or by a comparison to a digital target signal. If a comparison to a digital target signal is to be performed, the output signal s(t) is first converted into a digital signal before the comparison. The target value or the target signal can have been stored in the sequence controller 30, for example, after the production of the laboratory device 100 during the factory test and calibration.

FIG. 3 shows details of a first embodiment of the reference circuit 20. The reference circuit 20 comprises a series circuit of a first small capacitance C1 and a second larger capacitance C2 here, the second capacitance C2 being able to be short-circuited by the mentioned switching procedure. The short-circuiting of the second capacitance C2 is implemented by the closing of a switching element S, as indicated in FIG. 3. The control signal S1 causes an increase of the effective capacitance of the reference circuit 20 by the closing procedure of the switching element S. The control signal S1 can be output by the sequence controller 30, for example, as indicated in FIG. 3.

Figure 4A:
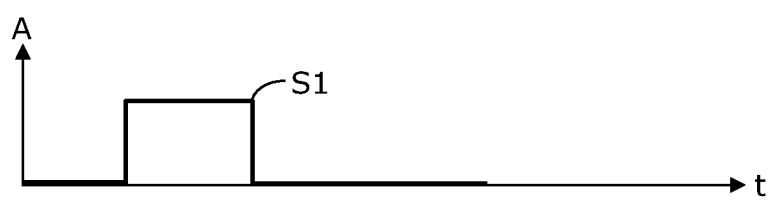
FIG. 4A shows a schematic view of a first exemplary control signal according to the invention.
Figure 4B:
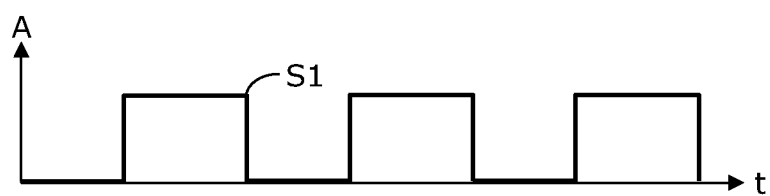
FIG. 4B shows a schematic view of a second exemplary control signal according to the invention.

It is indicated in FIGS. 4A and 4B that the control signal S1 can be a one-time square-wave pulse, for example (FIG. 4A), or that a pulse sequence having multiple square-wave pulses can be used as the control signal S1 (FIG. 4B). If a control signal S1 according to FIG. 4B is used, the circuit 2 is tested successively multiple times at short time intervals (specified by the interval of the pulses of the signal S1).

A second embodiment of the actual reference circuit 20 is shown in FIG. 5. The reference circuit 20 again comprises a series circuit of a first small capacitance C1 and a second larger capacitance C2, the second capacitance C2 being able to be short-circuited by the mentioned switching procedure. The short-circuiting of the second capacitance C2 is implemented by the closing of a switching element S. An FET (field-effect transistor) is used as the switching element S here, as indicated in FIG. 5. Upon application of the control signal S1 to the gate of the FET, this transistor switches through and a short-circuit occurs. A small increase of the effective capacitance of the reference circuit 20 results through this switching procedure. The control signal S1 can be output by the sequence controller 30 as indicated in FIG. 3, for example.

In FIG. 6A, an exemplary control signal S1.1 is shown in chronological relation to a directly generated output signal $s_1(t)$ of a first measuring channel. The control signal S1.1 is a square-wave pulse here, as shown in FIG. 6A. The rising and falling flanks of the square-wave pulse of the control signal S1.1 induce an output signal $s_1(t)$ in the circuit 2 similar to the immersion and removal of the feeler 3 into and from the liquid 1, as indicated schematically in FIG. 6B. The output signal $s_1(t)$ has a positive peak S11.1 and a negative peak S11.2 here. The positive peak S11.1 corresponds to the behavior of the feeler 3 upon immersion in a liquid 1 and the negative peak S11.2 corresponds to the behavior of the feeler 3 upon removal from the liquid 1. Depending on the embodiment of the signal analysis, the output signal $s_1(t)$ can also be inverted or have a different signal shape. As already noted, the output signal $s_1(t)$ can, for example, be compared to an analog reference signal or target signal. The output signal $s_1(t)$ can also be digitized, however, in order to then compare it to a digital target signal. The case illustrated in FIGS. 6A and 6B is also referred to as primary measurement, since a capacitance change is specified at a first measuring channel, and the reaction (in the form of the output signal $s_1(t)$) of the circuit 2 can also be observed on the same measuring channel.

Such a primary measurement can be repeated multiple times. In this case, for example, a signal according to FIG. 4B is specified as the control signal S1.

Such a primary measurement can also be repeated multiple times while the feeler 3 is moved, for example, in order to be able to establish whether the coaxial cable connections cause errors or whether, in the extreme case, signal failures even occur (e.g., having $s_1(t)=0$), which could be caused via a cable fracture, for example, which is only shown in specific situations.

Figure 7A:
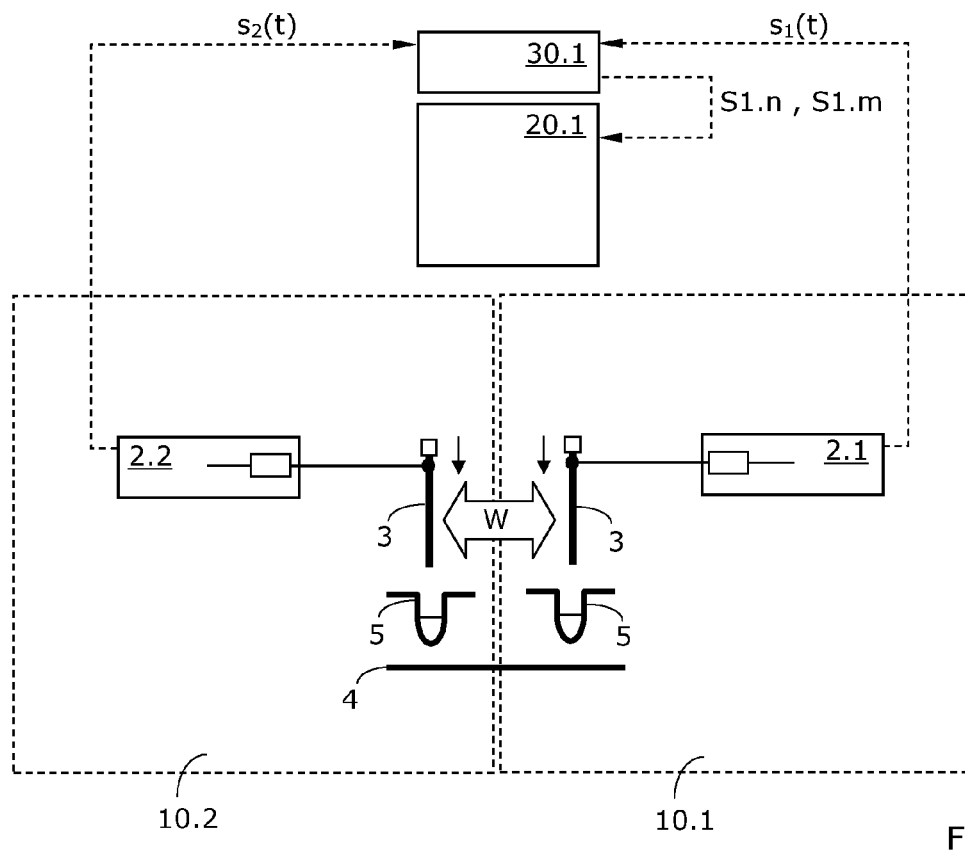
FIG. 7A shows a schematic block diagram of a further laboratory device according to the invention, which comprises multiple channels and central circuits according to the invention.

A further embodiment of a laboratory device 100 is shown in FIG. 7A, which has two channels 10.1, 10.2. Each of the channels 10.1, 10.2 is equipped essentially identically here as the single channel according to FIG. 3. I.e., in this embodiment, each of the two channels 10.1, 10.2 has the following components or parts: circuit 2.1 or 2.2, feeler 3, movement device (not shown). A higher-order central circuit having the block 30.1 and 20.1 is provided. This embodiment is suitable above all for devices 100 which have multiple channels 10.1, 10.2.

Each of the channels 10.1, 10.2 can be directly tested individually according to the above-described approach. During the direct testing of the channel 10.1, the circuit 2.1 of the channel 10.1 and the central sequence controller 30.1 and the central reference circuit 20.1 are primarily used. The primary output signal $s_1(t)$ of the first channel 10.1 is observed. During the direct testing of the channel 10.2, the circuit 2.2 of the channel 10.2 and the central sequence controller 30.1 and the central reference circuit 20.1 are primarily used. The primary output signal $s_2(t)$ of the second channel 10.2 is observed here. The control signal S1.$n$ (with n=1) appears precisely the same here as the control signal S1.1 in FIG. 6A, for example. The primary output signals $s_1(t)$ and $s_2(t)$ may appear like the signal $s_1(t)$ in FIG. 6B, for example.

However, in the embodiment shown in FIG. 7A, the mutual influence W (referred to as crosstalk) of the channels 10.1, 10.2 can also be tested. This can be performed as follows. In a corresponding first step, the channel 10.1 is directly tested, in that the circuit 2.1 of the channel 10.1, the sequence controller 30.1, and the reference circuit 20.1 are used as described above. An output signal results therefrom, which is designated here by $s_1(t)$ (with n=1). This output signal $s_1(t)$ is analyzed or evaluated by the sequence controller 30.1, for example. In a corresponding time-delayed second step, the sequence controller 30.1 and the reference circuit 20.1 may then be used on the channel 10.2. This time, the output signal $s_1(t)$ is again observed (indirect test of the channel 10.1), which is triggered by the circuit 2.1 as the reaction to the small capacitance change of the reference circuit 20.1 at the input of the circuit 2.2 and at the corresponding feeler 3 of the second channel. Through the crosstalk (designated here as the influence W), a very small capacitance change results at the input of the circuit 2.1, which is a function of the intentionally triggered capacitance change at the circuit 2.2, and of the stray capacitance $C_{tip/tip}$ between the two adjacent channels 10.1, 10.2.

Furthermore, for example, the channel 10.2 can now be tested directly and indirectly in corresponding further steps, for example.

Figure 7B:
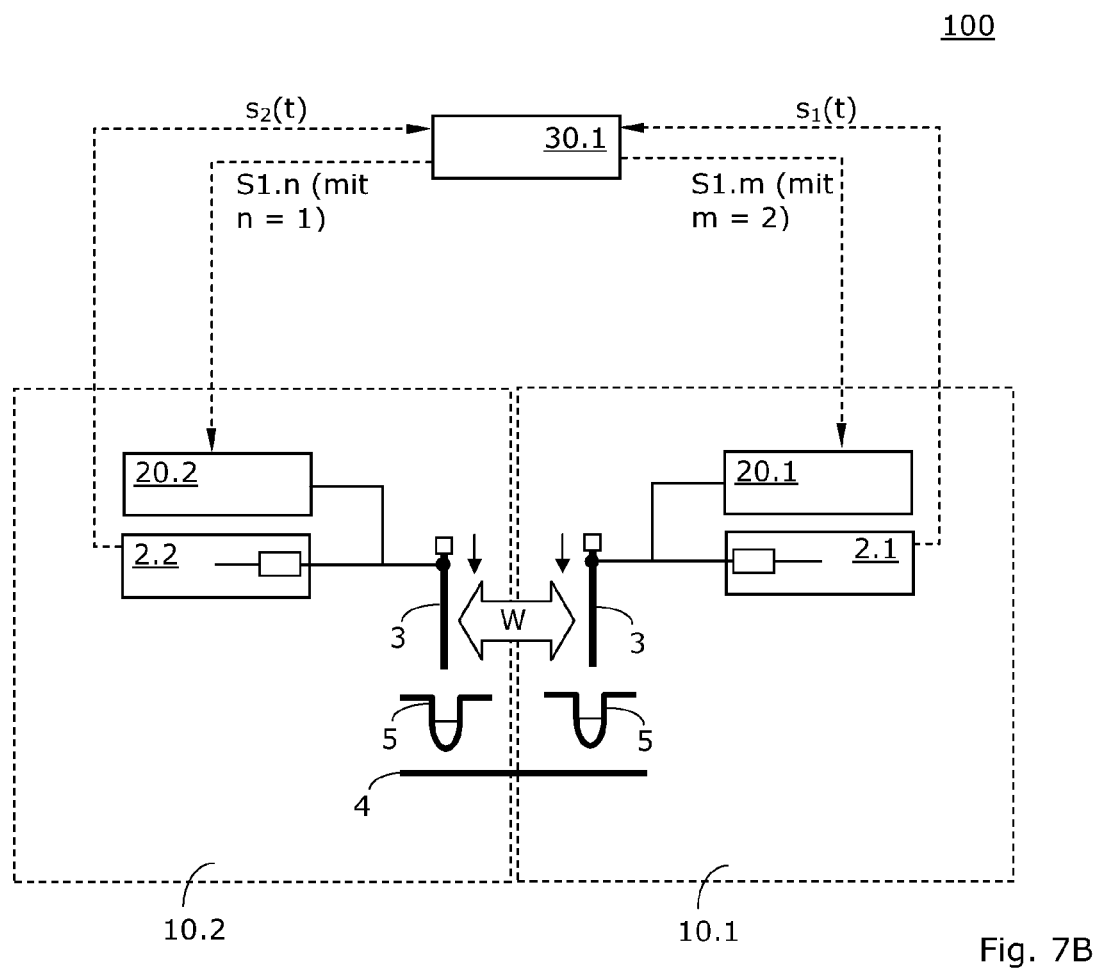
FIG. 7B shows a schematic block diagram of a further laboratory device according to the invention, which comprises multiple channels and one central circuit according to the invention.

A further embodiment of a laboratory device 100 is shown in FIG. 7B, which has two channels 10.1, 10.2. This embodiment is particularly preferred. Each of the channels 10.1, 10.2 is equipped essentially identically here as the single channel according to FIG. 3. I.e., in this embodiment each of the two channels 10.1, 10.2 has the following components or parts: circuit 2.1 or 2.2, reference circuit 20 or 20.2, feeler 3, movement device (not shown). A higher-order, central circuit having the block 30.1 is provided. This embodiment is suitable above all for devices 100 which have multiple channels 10.1, 10.2.

This embodiment of the laboratory device 100 functions similarly to the above-described embodiment shown in FIG. 7A. The single difference is that each channel 10.1, 10.2, etc. is assigned a separate reference circuit 20.1, 20.2, etc.

The mentioned steps are preferably controlled so that they run with a time delay, in order to be able to better differentiate and analyze/evaluate the individual output signals $s_n(t)$ and $s_m(t)$ (with n equal to the number of the odd-numbered channels and m equal to the number of the even-numbered channels) which are triggered. The time-delayed activation can be performed, for example, by a higher-order entity (referred to as a higher-order controller or master, which can be implemented as software and/or hardware). In FIGS. 7A and 7B, the higher-order controllers are implemented by the shared central sequence controllers 30.1.

The sequence of the mentioned method steps can also be selected differently.

Figure 8A:
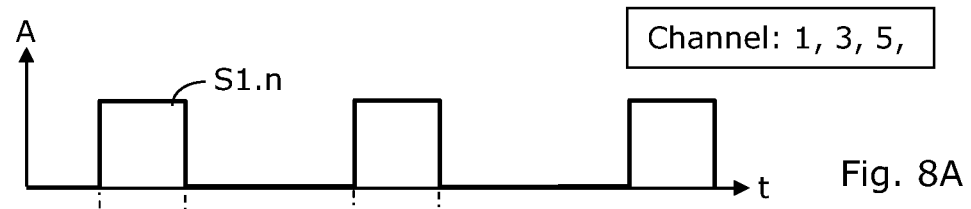
FIG. 8A shows a schematic view of a further exemplary control signal, which is applied according to the invention to the odd-numbered channels.
Figure 8B:
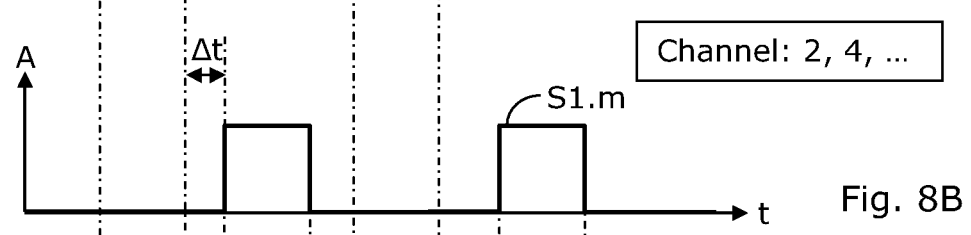
FIG. 8B shows a schematic view of a further exemplary control signal, which is applied according to the invention to the even-numbered channels.

Exemplary signals S1.$n$ and S1.$m$ are also shown in chronological relationship in FIGS. 8A and 8B. The control signal S1.$n$ is a pulse sequence having multiple square-wave pulses (FIG. 8A). These square-wave pulses of the control signal S1.$n$ may be used simultaneously for the direct test of the odd-numbered channels, for example (with n=1, 3, 5, etc.). The corresponding direct output signals of the odd-numbered channels are observed for the analysis or evaluation. A corresponding output signal $s_n(t)$ is shown in FIG. 9A, for example (with n=1, 3, 5, etc.). Pulses of a second control signal S1.$m$ (with m=2, 4, 6, etc.) may be applied to the even-numbered channels with a time delay to the pulses of the control signal S1.$n$. The corresponding direct output signals of the even-numbered channels are observed for the evaluation or analysis. A corresponding output signal $s_m(t)$ is shown in FIG. 9B, for example (with m=2, 4, 6, etc.). The direct test of the odd-numbered channels simultaneously triggers, however, because of the crosstalk, so-called interference or crosstalk peaks S5.2 in the circuits 2 of the even-numbered channels (see FIG. 9B). The direct test of the even-numbered channels correspondingly triggers, because of the crosstalk, so-called interference or crosstalk peaks S5.1 in the circuits 2 of the odd-numbered channels (see FIG. 9A). The interference or crosstalk peaks S5.1 or S5.2 are also referred to as secondary signals. These indirect tests are also referred to as secondary tests.

The primary test and secondary test may thus be performed simultaneously for all channels in two steps, as shown on the basis of the signals in FIGS. 8A, 8B, 9A, 9B. First step: test signal S1.$n$ on all odd channels causes primary signals $s_n(t)$ having peaks S6.1 on odd channels and secondary signals $s_m(t)$ having peaks S5.2 on even channels. Second step: test signal S1.$m$ on all even channels causes primary signals $s_m(t)$ having peaks S6 on even channels and secondary signals $s_n(t)$ having peaks S5.1 on odd channels.

A higher-order controller can be used, which triggers the control signals S1.$n$, S1.$m$, etc., for example, the time delay $\Delta t$ being able to be specified by the higher-order controller, as shown in FIGS. 8A, 8B.

In the embodiments shown in FIGS. 7A and 7B, the indirect mutual influences W (referred to as crosstalk) of the various channels may be tested particularly simply and reliably.

The laboratory device 100 according to the invention is designed in the various embodiments so that the reference circuit 20 specifies a smaller effective capacitance Ceff1 on the input side 6 of the circuit 2 through the series circuit of the first small capacitance C1 and the second larger capacitance C2. Through the short-circuit which can be triggered by the switching procedure via the signal S1, S1.1, or S1.$n$, S1.$m$, only the capacitance of the first small capacitance C1 is still active, and the effective capacitance Ceff2 thus increases by a small absolute value.

The smaller effective capacitance Ceff1 is calculated as follows:

$$Ceff1 = \frac{1}{\left(\frac{1}{C1} + \frac{1}{C2}\right)}$$

The first small capacitance C1 preferably has a capacitance between 10 and 100 pF (picofarad) and the second larger capacitance C2 has a capacitance between 2000 and 10000 pF.

If C1=22 pF and C2=4700 pF, then Ceff1=21.8975 pF when the switching element S is open (i.e., when there is no short-circuit). In case of short-circuit, only the first capacitance C1 is active and Ceff2=22 pF, with Ceff1<Ceff2. The difference between open switching element S and closed switching element S is thus 102.5 fF (femtofarad) in this example.

The drawings show the various elements and parts of the invention in a schematic block diagram, which is oriented more to the actual function than the concrete construction or the configuration of the elements and parts. The circuits 2, 20, and 30 (or the circuits 2.1, 2.2, 20.1, 30.1, etc.) may be combined with one another, for example. A part of the aspects can be implemented by suitable software. An embodiment is particularly preferred in which the signal processing on the input side 6 of the circuit 2, 2.1, 2.2 and the series circuit of the capacitances of the reference circuit 20, 20.1 are implemented in hardware. The other aspects are preferably implemented as software.

As described above, the crosstalk between multiple channels 10.1, 10.2 may be recognized using the reference circuit 20.1 and the sequence controller 30.1 of FIGS. 7A, 7B, although only two channels are shown in FIGS. 7A, 7B.

Figure 10:
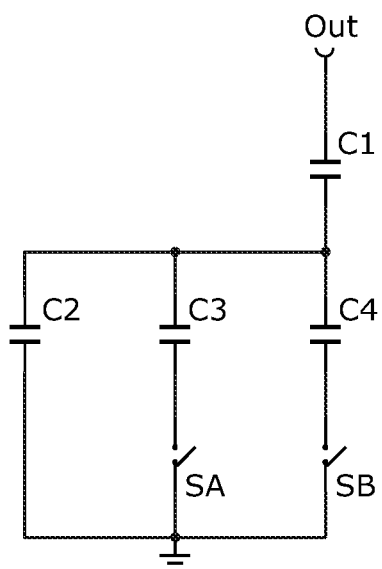
FIG. 10 shows a schematic block diagram of a part of a further reference circuit according to the invention.

The capacitance change according to the invention can also be performed in multiple stages. For this purpose, for example, a reference circuit 20 according to FIG. 10 can be used. Two switching elements SA and SB are used here, which may be switched via corresponding switching signals (similarly to the switching element S). In the configuration shown, the following total capacitances $C_{total}$ are shown:

SA and SB open:

$$C_{total\_1} = \frac{1}{\frac{1}{C_1} + \frac{1}{C_2}}$$

SA closed:

$$C_{total\_2} = \frac{1}{\frac{1}{C_1} + \frac{1}{C_2 + C_3}}$$

SB closed:

$$C_{total\_3} = \frac{1}{\frac{1}{C_1} + \frac{1}{C_2 + C_4}}$$

SA and SB closed:

$$C_{total\_4} = \frac{1}{\frac{1}{C_1} + \frac{1}{C_2 + C_3 + C_4}}$$

The following capacitance changes are possible using the capacitance values C1, C3=100 pF, C2=3.3 nF, and C4=220 nF:

$\Delta Ca = C_{total\_2} - C_{total\_1} = 84$ fF $\Delta Cb = C_{total\_3} - C_{total\_1} = 179$ fF $\Delta Cc = C_{total\_4} - C_{total\_1} = 253$ fF $\Delta Cd = C_{total\_3} - C_{total\_2} = 95$ fF $\Delta Ce = C_{total\_4} - C_{total\_2} = 169$ fF $\Delta Cf = C_{total\_4} - C_{total\_3} = 74$ fF In a further embodiment of the invention, the test method can also be used for classifying the liquid to be detected. I.e., the laboratory device 100 having the described reference circuit 20.1 and 20.2 can be used for this purpose. The circuit 2 according to the invention is thus used not only for testing a laboratory device 100, but rather can also be employed by the user for the purpose of obtaining a first statement about the conductivity of a liquid 1. This is preferably performed in that two adjacent feelers 3 of two adjacent channels 10.1, 10.2 are immersed simultaneously and jointly into the liquid 1. If a capacitance change is generated on a first of the two channels 10.1 by the corresponding reference circuit 20.1, a coarse statement about the conductivity and/or the dielectric constant of the liquid 1 can be made by observation of the output signal $s_2(t)$ of the other channel 10.2, for example. The size and, under certain circumstances, also the shape of the output signal $s_2(t)$ display a dependence on the conductivity and/or the dielectric constants. The amplitude or shape of the crosstalk signal (i.e., the output signal $s_2(t)$) permit statements about the properties of the liquid 1.

The described circuits 20.1, 30.1 may also be used, however, to recognize incorrectly connected or defective cable connections.

LIST OF REFERENCE NUMERALS liquid 1
electronic circuit 2
electronic circuit of the channel 10.1 2.1
electronic circuit of the channel 10.2 2.2
feeler which can be advanced (e.g., pipette tip) 3
baseplate 4
liquid container 5
input side 6
amplifier 7
circuit element 8
output 8.1
signal analysis circuit 9
first channel 10.1
second channel 10.2
positive peak S11.1
negative peak S11.2
reference circuit 20
central reference circuit 20.1
output side 21
sequence controller 30
central sequence controller 30.1
control signal line 31
laboratory device 100
signal amplitude A advance movement
first small capacitance C1
second larger capacitance C2
further capacitances C3, C4
smaller effective capacitance Ceff1
effective capacitance Ceff2
capacitance change $C_{meas}$
stray capacitance $C_{tip/tip}$
coupling capacitor $C_{coupl}$
capacitance between feeler and liquid $C_{tip/liq}$
capacitance between feeler and liquid upon $C_{tip/liq-in}$ immersion
capacitance between feeler and liquid when the $C_{tip/liq-out}$ feeler is not immersed
coupling capacitor $C_{coupl}$
capacitance between the feeler and the $C_{tip/worktable}$ worktable
capacitance of the cable $C_{cable}$
capacitance of the filter circuit $C_{filter}$
total capacitances $C_{total}$
capacitance change ΔC
high frequency fh
lower frequency ft
even number m
odd number n
charging resistance R
equivalent resistance of the liquid $R_{liq}$
equivalent resistance of the feeler $R_{tip}$
switch (or switching element) S, SA, SB
control signal S1
control signal of the odd-numbered channels S1.$n$
control signal of the even-numbered channels S1.$m$
control signal S1.1
switching element S2
output signal s(t)
output signal of the channel 10.1 $s_1(t)$
output signal of the channel 10.2 $s_2(t)$
output signal of the nth channel 10.$n$ (with n=$s_n$(t) 1, 3, 5, ...)
output signal of the mth channel 10.$m$ (with m=$s_m$(t) 2, 4, 6, ...)
time t
voltage source $U_q$
influence W
total impedance $Z_{tot}$
impedance of the voltage source $Z_q$

The invention claimed is:

1. A method for testing a laboratory device, comprising:
an electronic circuit for detecting a liquid level in a liquid container and
a feeler, which can be advanced, and which is connected to the input side of said circuit,
wherein the feeler can be advanced in the direction of the liquid in the liquid container and the feeler causes a capacitance change on the input side of the circuit upon immersion in the liquid, which triggers an output signal in said circuit wherein the following steps are executed for testing an electronic circuit of the laboratory device by means of simulating a detection of a liquid using a reference circuit [00011] having a series circuit of a first small capacitance and a second larger capacitance, the second capacitance being able to be short circuited by the switching procedure, the reference circuit specifying a smaller effective capacitance because of the series circuit of the first capacitance and the second capacitance:
 a. connecting an output side of said reference circuit to the input side of said electronic circuit, the reference circuit specifying an effective capacitance on the input side of said electronic circuit,
 b. triggering the testing by the application of a control signal to the reference circuit, the control signal causing an increase of the effective capacitance by a switching procedure, said switching procedure providing for a triggering of a short-circuit of the second capacitance so that only the capacitance of the first capacitance is active due to the short-circuit and that the effective capacitance is thus increased in relation to the effective capacitance;
 c. processing a corresponding predefined capacitance change by said electronic circuit and triggering of an output signal,
 d. analyzing this output signal, to allow a statement about the function of the electronic circuit.

2. The method according to claim 1, wherein the laboratory device comprises multiple channels, each channel comprising:
an electronic circuit for detecting the liquid level in a liquid container and
a feeler, which can be advanced, and which is connected to an input side of the electronic circuit,
characterized in that one reference circuit is provided per channel, and the steps a. to d. are performed per channel, the application of the control signal to the respective reference circuit being performed staggered in time.

3. The method according to claim 2, wherein, during the application of the control signal to one of the reference circuits, it is observed whether an interference signal results in other channels, or in the electronic circuit of one of the other channels, respectively.

4. The method according to claim 1, wherein the output signal, which is triggered by the application of the control signal to the reference circuit in step d., is compared to a specified reference signal, a qualitative judgment being performed in case of a deviation of the output signal from the reference signal.

5. The method for classifying a liquid to be detected in a laboratory device according to claim 2, which has two adjacent channels, characterized by the following steps:
immersing the two feelers of the two channels in a liquid,
triggering a capacitance change on one of the two channels,
analyzing the output signal on the other of the two channels.

6. The method according to claim 5, wherein, during the analysis of the output signal, the size and/or the shape of the output signal is/are analyzed, since these are a function of the conductivity and the dielectric constant of the liquid.

7. A laboratory device comprising:
an electronic circuit for detecting a liquid level in a liquid container,
a feeler, which can be advanced, and which is connected to an input side of the electronic circuit,
a movement device, which allows the feeler to be advanced in the direction of the liquid in the liquid container, a capacity change being able to be induced on the input side of the electronic circuit upon immersion of the feeler in the liquid, which triggers a signal in the electronic circuit,
wherein the laboratory device
 comprises a reference circuit, which
  is connectable to the input side of the electronic circuit, and
  which specifies an effective capacitance on the input side of the electronic circuit after this connection,
  which allows a testing of the electronic circuit by means of simulating a detection of a liquid using the reference circuit, and which has a series circuit of a first small capacitance and a second larger capacitance, the second capacitance being able to be short-circuited by a switching procedure, comprises a sequence controller, which causes the triggering of a test of the electronic circuit of the laboratory device by the application of a control signal to the reference circuit, the control signal causing an increase of the effective capacitance through said switching procedure, monitors the processing of the corresponding capacitance change by the electrical circuit and triggering of an output signal, and analyzes the output signal to allow a statement about the function of the electronic circuit.

8. The laboratory according to claim 7, wherein, after the connection of the reference circuit, the series circuit of the first small capacitance and the second larger capacitance results in a first effective capacitance, and only the capacitance of the first small capacitance is active due to the short-circuit, which can be triggered by the switching procedure, and the effective capacitance is thus increased.

9. The laboratory device according to claim 7, wherein the laboratory device comprises multiple channels, each channel comprising an electronic circuit for detecting the liquid level in a liquid container and a feeler, which can be advanced, and which is connected to an input side of the electronic circuit, wherein one reference circuit is provided per channel.

10. The laboratory device according to claim 9, wherein the sequence controller is designed so that the triggering of a test can be executed by the application of one control signal per channel, the application of the control signal to the respective reference circuit being performed staggered in time.

11. The laboratory device according to claim 7, wherein the laboratory device comprises multiple channels, and a central reference circuit and a central sequence controller are provided.

* * * * *